United States Patent [19]

Detroit

[11] Patent Number: 4,457,853

[45] Date of Patent: Jul. 3, 1984

[54] OIL WELL DRILLING CLAY CONDITIONERS AND METHOD OF THEIR PREPARATION

[75] Inventor: William J. Detroit, Schofield, Wis.

[73] Assignee: Reed Lignin Inc., Greenwich, Conn.

[21] Appl. No.: 372,141

[22] Filed: Apr. 27, 1982

Related U.S. Application Data

[63] Continuation-in-part of Ser. No. 277,714, Jun. 26, 1981.

[51] Int. Cl.$^3$ ................................................ C09K 7/02
[52] U.S. Cl. .............................. 252/8.5 A; 252/8.5 B; 260/124 R
[58] Field of Search .............. 252/8.5 A, 8.5 B, 8.5 C; 260/124 R

[56] References Cited

U.S. PATENT DOCUMENTS

| | | | |
|---|---|---|---|
| 2,393,166 | 1/1946 | Hoeppel | 252/8.5 B |
| 2,529,760 | 11/1950 | Bergman | 252/8.5 B |
| 2,935,473 | 5/1960 | King et al. | 260/124 |
| 3,138,555 | 6/1964 | King et al. | 252/8.5 C |
| 3,168,511 | 2/1965 | King et al. | 252/8.5 C |
| 3,244,623 | 4/1966 | King et al. | 252/8.5 C |
| 3,271,382 | 9/1966 | Quimby et al. | 260/124 |
| 3,448,096 | 6/1969 | Read | 260/124 |
| 3,957,703 | 5/1976 | Ludwig et al. | 260/124 |
| 3,985,667 | 10/1976 | Gray et al. | 252/8.5 C |

FOREIGN PATENT DOCUMENTS

| | | | |
|---|---|---|---|
| 691362 | 7/1964 | Canada | 252/8.5 C |
| 1437902 | 6/1976 | United Kingdom | 252/8.5 A |
| 663711 | 5/1979 | U.S.S.R. | 252/8.5 B |

*Primary Examiner*—Benjamin R. Padgett
*Assistant Examiner*—Howard J. Locker

[57] ABSTRACT

Improved drilling fluid additives or conditioners are obtained by oxidation of sulfonated lignin-containing materials with manganese dioxide and boron addition either before or after the oxidation step. The resulting manganese-boron lignosulfonates are more thermally stable and they are rheologically suitable as drilling fluid additives. Additional improvements in thermal stability and rheological properties are realized by complexing the manganese-boron lignosulfonates with a heavy metal cation, notably, iron, preferably used as ferrous sulfate.

22 Claims, No Drawings

OIL WELL DRILLING CLAY CONDITIONERS AND METHOD OF THEIR PREPARATION

RELATED APPLICATION

This application is a continuation-in-part of commonly assigned application Ser. No. 277,714 filed June 26, 1981.

FIELD OF INVENTION

This invention relates to drilling fluid additives or conditioners and is particularly related to such additives or conditioners which are chromium-free.

In one aspect, the present invention relates to drilling fluid additives or conditioners formed by the addition of boron to sulfonated lignin-containing materials either before or after oxidation of the sulfonated lignin containing materials with manganese dioxide.

In another aspect, this invention is concerned with sulfonated lignin-containing materials which are complexed with manganese and boron or with manganese, iron and boron to form, respectively, manganese-boron-containing lignosulfonates or ferro-manganese-boron containing lignosulfonates.

The present invention also disclosed method of making these chrome-free drilling fluid additives or conditioners.

BACKGROUND OF INVENTION

It is a matter of common experience in the oil and gas industry that the drilling of oil or gas wells is carried out with the aid of a circulating drilling mud or drilling fluid. As mentioned in U.S. Pat. No. 3,035,042, issued on May 15, 1962 to Charles H. Hoyt, the circulating drilling fluid serves to cool and lubricate the drill; remove and transport drill cutting to the surface; help the drill bit perform by its hydraulic action; cement or seal the walls of the drill hole; hold the drill cuttings in suspension when drilling is stopped and form a hydrostatic head and thus serve to control the flow of high pressure gas, oil or water.

Also, as discussed in U.S. Pat. No. 3,076,759, issued to Van Dyke et al on Feb. 5, 1963, the most commonly used drilling fluids are aqueous dispersions of clay such as bentonite, illite, kaolinite and other similar materials. As mentioned in this patent, for a drilling fluid to be satisfactorily used in the drilling of wells, it must have a sufficiently low viscosity so that it can readily carry rock chips which are loosened by the drill bit to the surface, and it must be thixotropic so taht when the drilling is discontinued, the fluid will gel and prevent the rock chips from settling around the drill bit. Also, it must have the proper yield point to allow resumed fluid circulation when desired.

Another important property of a satisfactory drilling fluid is its ability to seal the porous formations of the well bore. This property is measured by a standard test commonly referred to as water loss, fluid loss or "wall-building".

It has heretofore been difficult, if not impossible, to obtain a drilling fluid having the aforementioned combination of properties without the use of certain additives. Such additives, in the past, included bentonite, starch, gums, tannins, sodium silicate, etc. More recently, however, modified lignosulfonates derived from spent sulfite liquor have proven to be effective additives for attaining the desired properties in a drilling fluid.

Thus, U.S. Pat. No. 2,953,473 issued to King et al on May 3, 1960 discloses a drilling fluid composition which is a combination of drilling mud and specially treated sulfonated lignin-containing material. These sulfonated lignin-containing materials are commonly referred to as "drilling fluid additives" or simply "additives", and their inclusion in the drilling mud or the drilling fluid compositions serves to attain the desired properties which were heretofore discussed.

The sulfonated lignin-containing materials described in the aforementioned King et al patent are derived from spent lignin liquors obtained from the pulping of woods. These sulfonated lignin-containing materials are soluble in the drilling fluid and are highly effective additives in both lime base muds as well as fresh water muds.

In order to improve the effectiveness of the sulfonated lignin-containing materials as drilling fluid additives, King et al recommend converting the sulfonated lignin-containing material to a salt of iron, chromium, copper and aluminum, or combination of said salts. These sulfonated lignin-containing materials comprising said metallic salts are then subjected to oxidation using various oxidants to be hereinafter described. The oxidation changes the constitution of the sulfonated lignin-containing materials and results in additives having enhanced properties.

Alternatively, King et al disclose that the sulfonated lignin-containing materials may be oxidized directly regardless of whether the aforementioned salts are first formed.

With regard to the choice of the oxidizing agents, King et al set forth two criteria; one is the strength and power of the oxidizing agent, and the second is the quantity of the oxidant. The recommended oxidizing agents are those which have a range of oxidation potentials greater than $-1.3$. These oxidants include hydrogen peroxide, ozone, lead dioxide, chromic acid, chlorine, alkali and alkaline earth hypochlorite, alkali metal chromate (containing chromium ion), alkali metal permanganate (containing manganese ion), alkali metal persulfate, alkali metal perborate, and electrolytic oxidation.

Other patents of interest by way of general background in this field include U.S. Pat. Nos. 2,935,504; 3,007,864; 3,168,511; 3,634,387; 3,686,119 and 4,220,585.

The principal oxidant in Hoyt's U.S. Pat. No. 3,035,042 is chromium and the additive which is formed is a sulfonated-lignin-iron-chromium complex.

The additive disclosed in the aforementioned patent of Van Dyke et al is also a chromium complex and is substantially iron-free, water-soluble chromium complex of a lignosulfonate.

Although chromium complexed lignosulfonates have achieved a certain degree of acceptability as drilling fluid conditioners, they are environmentally undesirable due to the poisonous nature of chromium. In fact, in several countries including the U.S., legislations have been enacted, are pending, or being considered, prohibiting the use of chromium complexed lignosulfonates due to their adverse impact on the environment.

King et al, in their aforementioned patent, disclose oxidants other than chromium. These patentees also disclose that additives obtained by direct oxidation of lignin-containing materials are less effective than additives obtained by the conversion of the lignin-containing materials to salts, followed by the oxidation of these salts with various oxidants such as those containing the metal ions chromium and manganese which have oxidation potentials greater than −1.3. However, conversion of the lignin-containing materials to their salts, followed by the oxidation of the salts involves a cumbersome and costly procedure.

In my aforementioned application Ser. No. 227,714, I disclose chromium-free, manganese-containing lignosulfonates and chromium-free, ferro-manganese-containing lignosulfonates as drilling fluid additives or conditioners. However, experience has shown that some of these lignosulfonate complexes lack the desired degree of thermal stability at temperatures above 250° F. particularly at low manganese and/or iron levels.

Accordingly, it is an object of the present invention to provide chromium-free drilling fluid additives or conditioners which, in addition to the requisite rheological properties, have higher degree of thermal stability.

It is also an object of this invention to provide such drilling fluid additives or conditioners by complexing manganese lignosulfonates with boron, or boron and iron.

It is a further object of this invention to provide effective and thermally stable drilling fluid additives or conditioners by less cumbersome and more economical procedure than hitherto possible in the prior art methods of making chromium-containing lignosulfonates.

The foregoing and other objects of this invention will be more clearly comprehended from the following detailed description of the invention.

SUMMARY OF INVENTION

A boron compound, preferably boric acid, is complexed with a sulfonated lignin-containing material, either before or after oxidation of the lignin-containing material with manganese dioxide. The resulting boron-manganese lignosulfonates, when used in combination with a drilling fluid, exhibit improved properties as drilling fluid additives and, in addition, they are thermally stable at temperatures of as high as about 300° F. or even higher.

Further improvements in rheological properties and thermal stability are realized by complexing the boron-manganese lignosulfonate with a heavy metal cation, preferably iron.

These drilling fluid additives are chromium-free and therefore have no adverse environmental impact.

DETAILED DESCRIPTION OF INVENTION

In my aforementioned copending application Ser. No. 277,714 I disclose that, surprisingly, the oxidation of sulfonated lignin-containing materials with manganese dioxide ($MnO_2$), which has an oxidation potential of −1.23, yields manganese lignosulfonates having highly desirable properties as mud thinners or drilling fluid additives or conditioners. Further improvements in rheological properties were obtained by complexing the manganese lignosulfonates with a heavy metal cation such as iron, copper, aluminum, magnesium, zirconium, or combinations thereof, with iron constituting the preferred heavy metal complexing cation.

The manganese lignosulfonates obtained by oxidation of sulfonated lignin-containing materials in accordance with my aforementioned application, and the heavy metal ion-complexed manganese lignosulfonates exhibit improved apparent viscosities, yield points and 10 minutes gel strength compared to chromium lignosulfonates. Moreover, the so-called "water-loss" property of the products of the invention is at least comparable to or better than the water loss associated with the use of chromium lignosulfonates.

Also, and unlike chromium lignosulfonates, the use of manganese lignosulfonates or manganese-heavy metal ion-complexed lignosulfonates is not environmentally objectionable since they have no adverse effects upon the environment.

The lignin-containing starting materials which are useful in making the products described in my aforementioned application are well known and, in general, they are described in the aforementioned King et al patent. The desired starting lignosulfonates are usually spent lignin liquors obtained from pulping of wood. Lignosulfonates of hardwood or softwood origin, obtained from calcium sulfite spent liquor (SSL from calcium sulfite pulping of wood) provide a particularly desirable source of starting raw material in the practice of this invention. Preferably, these lignosulfonates are treated to remove their reducing sugars by fermentation (alcohol or yeast) or by using calcium bisulfite under high temperature and high pressure. The sugar-destroyed, calcium-based spent sulfur liquors, or the spent sulfite liquor used as the starting raw materials will hereinafter be also referred to generally as "sulfonated lignin-containing materials".

As it was previously mentioned, while the manganese lignosulfonates and manganese-heavy metal cation lignosulfonates exhibit good rheological properties for use as drilling fluid additives or conditioners, they sometimes lack the necessary thermal stability at temperatures higher than about 250° F. It has now been further discovered that the addition of boron, or boron and iron, to manganese lignosulfonates enhances their thermal stability. Consequently clay conditioners containing manganese-boron lignosulfonates or manganese-boron-heavy metal cation lignosulfonates, are thermally stable above 250° F., and at temperatures as high as about 300° F. or even higher. Furthermore, less heavy metal cation can be used when boron is added in accordance with this invention.

In general, and broadly speaking, the products of this invention are obtained by adding the boron compound to the sulfonated lignin-containing material under acidic conditions, either before or after the oxidation of the lignosulfonate with manganese dioxide, followed by recovering the manganese-boron lignosulfonate. Additional improvement in both the rheological properties and thermal stability are realized by complexing the manganese-boron lignosulfonate with a heavy metal cation, preferably iron, to obtain manganese-boron-iron lignosulfonate.

The lignosulfonate starting materials which are useful in the practice of the present invention are the same lignosulfonates which are disclosed in my aforementioned copending application, the disclosure of which is fully incorporated herein by reference.

Initially, and optionally, the sulfonated lignin-containing material may be activated by heat treatment with an acid, aldehyde polymerization, oxidation with an oxidizing agent other than manganese dioxide, ultrasonic energy, or a combination thereof. While not wishing to be bound by any particular theory or mechanism, it is believed that this activation step results in the polymerization, i.e., conversion, of the lower molecular weight constituents of the lignosulfonates into higher molecular weight fractions which are better suited for oxidation with manganese dioxide.

Where such activation step is used, mineral acids such as sulfuric acid, nitric acid, phosphoric acid or hydrochloric acid may be effectively employed, with sulfuric acid constituting the preferred mineral acid.

Acid activation may be conveniently carried out at a temperature of from about 50° C. to about 100° C. for a period of several minutes, preferably about 10 to about 60 minutes, using from about 15 to about 30 weight percent of acid based on the solids content of the lignosulfonate starting material.

Suitable aldehydes in the activation step include formaldehyde, furfural, benzaldehyde and the like, with formaldehyde constituting the aldehyde of choice.

The oxidizing agents include oxygen, ozone, nitric acid, hydrogen peroxide, etc. Manganese dioxide, however, is not used during the activation step.

The sulfonated lignin-containing material, which may have been activated as aforesaid, is then reacted with a boron compound, which is, preferably, boric acid ($H_3BO_3$), followed by oxidation with manganese dioxide. The addition of boron and the oxidation with manganese oxide are both carried out under acid conditions, using any one of the aforementioned mineral acids, preferably sulfuric acid.

Alternatively, the sulfonated lignin-containing material, which may have been activated as aforesaid, is first oxidized with manganese oxide prior to the addition of the boron compound, under acidic conditions.

Whether the sulfonated lignin-containing starting material is first activated as heretofore described before the oxidation step, or oxidized without prior activation, the amount of acid used can vary from about 15 percent to about 30 percent, preferably from about 20 to about 25 percent, based on the solids content of the lignosulfonates, and depending on the particular lignosulfonate starting material. The addition of the acid, which is preferably sulfuric acid, lowers the pH of the mixture to as low as 1 or even lower.

Although orthoboric acid is the boron compound of choice in the practice of this invention, other compounds of boron may also be used, if desired. Such boron compounds include pentahydrate tetraborate, metaborate, other hydrates of tetraborate, e.g., Borax, anhydrous tetraborate, water soluble organic and inorganic boron compounds, and the like.

The amount of boron compound which can be used depends on the type of lignosulfonate starting material. Sufficient boron compound is added so that the boron content, based on the final product, is from about 1 to about 5 weight percent, and is preferably from about 1.5 to about 3.0 weight percent.

The amount of manganese dioxide employed also depends on the type of lignosulfonate starting material. This amount can vary from about 15 percent to about 30 percent, preferably from about 20 percent to about 25 percent, based on the solids content of the lignosulfonate starting material.

The manganese dioxide used for the oxidation of the lignosulfonate has an oxidation potential of $-1.23$ and is generally available and used in powder form at approximately 98 percent purity.

The oxidation of the lignosulfonate with manganese dioxide is carried out under highly acid conditions at atmospheric pressure and a temperature of from about 0° C. to about 90° C. Since this oxidation reaction is highly exothermic, the mixture must be cooled with agitation so that this temperature does not exceed about 90° C., although it is usually preferable to maintain this temperature about 70° to 80° C.

The rate of addition of the manganese dioxide depends on its purity and concentration, the concentration of solids in the lignosulfonate and the effectiveness of agitation. This rate is usually controlled so that the reaction is completed within several minutes to 2 hours, preferably within 10 minutes to 1 hour.

The boron addition step is also carried out under highly acidic conditions at atmospheric pressures and at a temperature of from about 0° C. to about 90° C., preferably at about 60° C. to about 80° C.

The recovered manganese-boron lignosulfonates contain from about 1 to about 5 percent, preferably from about 1.5 to about 3.0 percent, boron, and from about 8 to about 20 percent, preferably from about 12 to about 16 percent equivalent manganese, all percentages being based on the manganese-boron lignosulfonate product.

The manganese-boron lignosulfonates produced by the present invention exhibit all the desirable rheological attributes required for a good drilling fluid additive or conditioner. These properties include apparent viscosity, yield point, 10 minutes gel strength and water loss. In addition, these products are thermally stable at temperatures of about 300° F. or even higher.

After completion of the oxidation reaction, it is generally desirable to adjust the pH of the resulting mixture by the addition of a suitable base such as alkali metal hydroxide or alkaline earth metal hydroxide to raise the pH to about 3.0 to 4.5. These hydroxides include sodium hydroxide, potassium hydroxide, calcium hydroxide and lithium hydroxide.

Due to its low cost, sodium hydroxide constitutes the hydroxide of choice and is usually used in dilute concentrations, e.g., as about 20% solution. The sodium hydroxide is usually added at ambient conditions although it may also be added at the temperature of the mixture upon completion of the oxidation step.

When using sulfuric acid in the activation step, or in the direct oxidation of the sulfonated lignin-containing materials, or when the sulfuric acid is used in combination with other acids, calcium sulfate (gypsum) will precipitate from the mixture. Thus, after the neutralization step, or if no neutralization step is necessary after the oxidation step, the calcium sulfate precipitate must be removed by any of the well known methods which include the use of rotary vacuum filters, centrifugation, filtration, settling, etc.

In another aspect of this invention, the filtrate (manganese-boron lignosulfonate) is complexed with a heavy metal cation to produce manganese-boron-heavy metal cation complexed lignosulfonate. A variety of heavy metal cations are suitable for this purpose. These include iron, copper, aluminum, magnesium, zinc, zirconium, or a combination thereof. Iron, used as ferrous sulfite, ferric sulfate, ferrous sulfate heptahydrate, ferric sulfate heptahydrate, ferric chloride, ferric acetate, and the like, may be used during the complexing step. Ferrous sulfate, however, constitutes the choice source for iron.

When the complexing cation is copper, zinc, or any of the other aforementioned cations, they are preferably used as sulfates although the chlorides, acetates or other salts may be used efficaciously.

When complexing with iron is desired, the iron is usually added to the filtrate as iron (ferrous or ferric) sulfate in a quantity which would result in about 2.5 to about 15 percent, preferably about 5 to about 10 percent iron in the final manganese-boron-iron-complexed lignosulfonate.

Whether the ultimate product is manganese-boron lignosulfonate or manganese boron-iron lignosulfonate, it may be used either as a liquid or it may be spray dried in powder form for use as oil drilling fluid additive or conditioner. The boron content and the manganese content of the manganese-boron-iron lignosulfonates are essentially the same as in the manganese-boron lignosulfonate products which were previously described.

The following examples will further serve to illustrate the preparation of the products of this invention and their advantageous drilling fluid conditioning properties. It must be understood, however, that these examples are merely illustrative and are not intended to limit the scope of the present invention.

In the following examples, all measurements of apparent viscosity, yield point, gel strength and Fann degree readings were made in accordance with API Recommended Practice 13B, "Standard Procedure For Testing Drilling Fluids", 6th Edition, published by the American Petroleum Institute April 1976.

EXAMPLE I 100 grams of yeast fermented softwood spent sulfite liquor (Norlig 91, available from the American Can Company) solids as 30% solution in water was heated to 50° C. and treated with 20 grams of sulfuric acid (100%) as a 40% solution in water (50 grams) under mechanical agitation. The acidic reaction mixture was heated to 90° to 100° C. for one hour and 28.6 grams of orthoboric acid added. The temperature was allowed to cool to 58° C. over a 47 minute period and 20 grams of manganese dioxide was then added as a 35% slurry suspension in water under continued agitation while the exothermic reaction mixture was cooled with air to below 65° C. After 30 minutes, the total reaction mass was 488 grams and its pH was 2.6. The reaction mass was split and 244 grams filtered to recover approximately 73 grams of solids as a 29.6% solution in the filtrate. The calcium sulfate (gypsum) solids filter cake was discarded. 101 grams of filtrate, containing 30 grams of solids, was heated to 60° to 70° C. and 20.7 grams of ferrous sulfate heptahydrate added as solid powder, dissolved and reacted in the filtrate over a 30 minute period under mechanical agitation. The resulting solution of boron-ferro manganese lignosulfonate was then spray dried at 230° F. inlet temperature to recover solid powder boron-ferro manganese lignosulfonate.

The material recovered in this example was evaluated as an additive in a calcium montmorillonite clay system and compared to commercially available chrome lignosulfonates as well as chrome-free lignosulfonate for oil well drilling clay conditioning. The comparative results are shown in Table I, below.

The evaluation test is described below using aged 28% Panther Creek calcium bentonite prepared in deionized water.

Test Procedure (1) Add 1.75 grams of salt to a barrel equivalent (350 cc) of 28% by weight Panther Creek bentonite which has been aged for at least 7 days.

(2) Stir for 3 minutes on a Hamilton Beach mixer at 7500±500 rpm.

(3) Add 5 grams of the sample to be tested.

(4) After the sample has been mixed with the mud for one minute, add sufficient caustic soda solution (1 ml=0.25 gram sodium hydroxide) so that the pH measures 9.5±0.1 after 20 minutes of total stirring time.

(5) The mud is stirred on a Hamilton Beach Model 30 mixer at 7500±500 rpm during this 20 minute stirring time.

(6) Measure the flow properties on a Fann Model 35G viscosimeter Record the values of apparent viscosity (cps), yield point (lbs./100 sq.ft.), degree Fann readings (600, 300, 3) and 10 minute gel strength (lbs./100 sq.ft.).

(7) Hot roll the sample overnight at 150° F.

(8) Cool the samples to room temperature. Readjust the pH to 9.5±0.1 with additional caustic soda solution and stir for 5 minutes before measuring hot roll properties.

(9) Measure the hot rolled flow properties as described in (6).

(10) Charge the hot rolled mud system to a high pressure stainless steel system, pressurize to 500 lbs./sq.in. with nitrogen gas pressure and roll at 300° F. for 3 hours.

(11) Cool the samples to room temperature. Readjust the pH to 9.5±0.1 with additional caustic soda and stir for 5 minutes before measuring Bombed properties.

(12) Measure the Bombed rheological flow properties as described in step 6 above.

EXAMPLE II

Another 150 gram sample of yeast fermented softwood spent sulfite liquor solids, as in Example I, was diluted to 25% solids and treated with 36 grams of sulfuric acid (100%) as a 40% solution in water with agitation at approximately 70° C. This mixture was heated to 80° to 85° C. for 1 hour and 36 grams of manganese dioxide was added as a 35% slurry in water over a 20 minute period under mechanical agitation while the exothermic reaction mass was cooled to hold below 85° C. The reaction mass was neutralized to pH 3.3 by addition of 1.8 grams of calcium oxide as a 120 gram/liter slurry in water. The reaction mass was then filtered to remove calcium sulfate (gypsum), and the cake was washed with water. 191 grams of product solids were recovered in a 20% filtrate solution. 43 grams of solids of the filtrate solution. 43 grams of solids of the filtrate was treated with 12.5 grams ferrous sulfate heptahydrate at 60° C. with mechanical agitation. The final product containing 5% iron based on solids was spray dried at 230° F. inlet temperature and the resulting ferro manganese lignosulfonate was evaluated as in Example I. The test results are shown in Table I, under Example IIA.

37.4 grams of solids of the filtrate was treated with 5.7 grams of boric acid powder by addition at 60° to 70° C. with mechanical agitation. The reaction was held 20 minutes followed by the addition of 12.5 grams of ferrous sulfate heptahydrate with agitation at a temperature range of 60° to 70° C. The final product, containing 2% boron and 5% iron based on solids, was spray dried at 230° F. inlet temperature and the resulting boron-ferro manganese lignosulfonate material was evaluated as in Example I. Test results are shown in Table I under Example IIB.

EXAMPLE III

TABLE I

|  | Chrome Lignosulfonate Reference 1 | Chrome Lignosulfonate Reference 2 | Chrome-Free Lignosulfonate Reference 3 | Product Example I | Product Example II A | Product Example II B | Product Example III A | Product Example III B |
|---|---|---|---|---|---|---|---|---|
| INITIAL | | | | | | | | |
| Apparent Viscosity | 36 | 24 | 22 | 27 | 22 | 20 | 25 | 25 |
| Yield Point (Lbs./100 sq. ft.) | 37 | 17 | 13 | 20 | 13 | 10 | 18 | 17 |
| Fann° | | | | | | | | |
| 600 | 71 | 47 | 43 | 54 | 43 | 40 | 50 | 49 |
| 300 | 54 | 32 | 28 | 37 | 28 | 25 | 34 | 33 |
| 3 | 32 | 12 | 6 | 17 | 4 | 2 | 10 | 9 |
| 10 Minute Gel | 62 | 61 | 57 | 100 | 69 | 64 | 87 | 97 |
| HOT ROLLED 150° F., 6 hrs. | | | | | | | | |
| Apparent Viscosity | 47 | 25 | 21 | 19 | 19 | 18 | 22 | 18 |
| Yield Point (Lbs./100 sq. ft.) | 61 | 15 | 12 | 6 | 8 | 6 | 11 | 7 |
| Fann° | | | | | | | | |
| 600 | 93 | 49 | 42 | 38 | 38 | 36 | 43 | 37 |
| 300 | 77 | 32 | 27 | 22 | 23 | 21 | 27 | 22 |
| 3 | 46 | 8 | 4 | 2 | 3 | 2 | 3 | 2 |
| 10 Minute Gel | 44 | 26 | 20 | 24 | 20 | 20 | 23 | 23 |
| BOMBED 300° F., 3 hrs. | | | | | | | | |
| Apparent Viscosity | 46 | 24 | 33 | 23 | 29 | 23 | 27 | 25 |
| Yield Point (Lbs./100 sq. ft.) | 56 | 13 | 31 | 13 | 23 | 15 | 19 | 15 |
| Fann° | | | | | | | | |
| 600 | 92 | 47 | 65 | 45 | 57 | 45 | 53 | 49 |
| 300 | 74 | 30 | 48 | 29 | 40 | 30 | 36 | 32 |
| 3 | 41 | 5 | 24 | 7 | 17 | 11 | 12 | 10 |
| 10 Minute Gel | 36 | 23 | 38 | 33 | 39 | 41 | 36 | 43 |

Reference 1: contains 3.4% chromium.
Reference 2: contains 4.0% chromium.
Reference 3: chromium-free iron complexed manganese lignosulfonate made according to copending application serial no. 277,714 filed June 26, 1981.

135 grams of yeast fermented softwood spent sulfite liquor (Norlig 91) solids and 15 grams of hardwood whole liquor (Norlig 41, also available from American Can Company) solids was heated to 70° C. and 36 grams of sulfuric acid (100%) added as a 40% solution in water (90 grams) under mechanical agitation. The acidic reaction mixture was held at 70° C. for 30 minutes, cooled to 65° C. and 36 grams of manganese dioxide added as a 35% slurry with agitation and air cooling of the exothermic reaction mixture to below 70° C. After holding 140 minutes at 65° to 70° C., the pH of the reaction mixture was 3.0. 10 cc of 120 grams/liter calcium oxide was added (1.2 grams calcium oxide) to give a pH of 3.5 and the batch was filtered at that pH. The calcium sulfate (gypsum) sludge filter cake was discarded. 194.2 grams of solids were recovered as a 28.4% aqueous solution of filtrate. 151.0 grams of the filtrate containing 43.0 grams of solids was reacted with 12.5 grams of ferrous sulfate heptahydrate added as a solid powder at 60° C. with agitation. The resulting solution of manganese lignosulfonate was spray dried at 230° F. inlet temperature to recover solid powder manganese lignosulfonate containing 5% iron. This material was evaluated as described in Example I. The test results are shown in Table I, under Example IIIA.

131.7 grams of filtrate containing 37.4 grams of solids was reacted with 5.7 grams of orthoboric acid at 60° C. with agitation, held 15 minutes and then reacted with 12.5 grams of ferrous sulfate heptahydrate added as a solid powder at 60° C. with agitation. The resulting solution of boron-ferro manganese lignosulfonate was Spray dried at 230° F. inlet temperature to recover solid powder boron-ferro manganese lignosulfonate containing 2% boron and 5% iron. This material was evaluated as described in Example I. This test results are shown in Table I, under Example IIIB.

As shown in Table I, the products of Examples I, IIA, IIB, IIIA and IIIB show improved thermal stability at 300° F. compared to products made according to my aforementioned application and are at least comparable to the best known chromium-containing lignosulfonates. These improvements are evidenced from comparison of the rheological flow properties, particularly the yield points of the different products.

I claim:

1. An oil well drilling fluid additive comprising the reaction product of sulfonated lignin-containing material with manganese dioxide and a boron compound having from about 1 to about 5 percent by weight boron and from about 8 to about 20 percent by weight manganese.

2. An oil well drilling fluid additive as in claim 1 wherein said boron content is from about 1.5 to about 3.0 percent by weight.

3. An oil well drilling fluid additive as in claim 1 wherein said manganese content is from about 12 to about 16 percent by weight.

4. An oil well drilling fluid additive as in claim 1 wherein said boron content is from about 1.5 to about 3.0 percent by weight and said manganese content is from about 12 to about 16 percent by weight.

5. An oil well drilling fluid additive comprising the reaction product of sulfonated lignin-containing material with manganese dioxide, a boron compound and a heavy metal cation having from about 1 to about 5 percent by weight boron, from about 8 to about 20 percent by weight manganese and from about 2.5 to about 15 percent by weight heavy metal cation.

6. An oil well drilling fluid additive as in claim 5 wherein said boron content is from about 1.5 to about 3.0 percent by weight.

7. An oil well drilling fluid additive as in claim 5 wherein said manganese content is from about 12 to about 16 percent by weight.

8. An oil well drilling fluid additive as in claim 5 wherein said heavy metal cation content is from about 5 to about 10 percent by weight.

9. An oil well drilling fluid additive as in claim 5 wherein said boron content is from about 1.5 to about 3.0 percent by weight, said manganese content is from about 12 to about 16 percent by weight and said heavy metal cation content is from about 5 to about 10 percent by weight.

10. An oil well drilling fluid additive as in claims 5, 6, 7, 8 or 9 wherein said heavy metal cation is iron.

11. A process for preparing sulfonated lignin-manganese-boron complex which comprises adding a compound of boron to a sulfonated lignin-containing material under acidic conditions, at a temperature of from about 0° C. to about 90° C. to form boron-complexed sulfonated lignin-containing material, and oxidizing the resulting boron-complexed sulfonated lignin with manganese dioxide under acidic conditions in the presence of a mineral acid, at a temperature of from about 0° C. to about 90° C., wherein the amounts of boron compound and manganese dioxide used are such that the final product contains from about 1 to about 5 weight percent boron and from about 8 to about 20 weight percent manganese.

12. A process as in claim 11 wherein said mineral acid is sulfuric acid.

13. A process as in claim 11 or 12 wherein said compound of boron is boric acid.

14. A process for preparing sulfonated lignin-manganese-boron complex which comprises oxidizing a sulfonated lignin-containing material under acidic condition, at a temperature of from about 0° C. to about 90° C. to form manganese-complexed sulfonated-lignin-containing material, and reacting said manganese-complexed sulfonated lignin-containing material with a compound of boron under acidic conditions, at a temperature of from about 0° C. to about 90° C., wherein the amounts of boron compound and manganese compound are such that the final product contains from about 1 to about 5 weight percent boron and from about 8 to about 20 weight percent manganese.

15. A process as in claim 14 wherein said mineral acid is sulfuric acid.

16. A process as in claim 14 or 15 wherein said compound of boron is boric acid.

17. A process as in claim 11, 12, 14, or 15 wherein said manganese-boron-complexed sulfonated lignin-containing material is further reacted with a compound of heavy metal cation to form manganese-boron-heavy metal cation complexed sulfonated lignin-containing material.

18. A process as in claim 17 wherein said heavy metal cation is iron.

19. A process as in claim 13 wherein said manganese-boron-complexed sulfonated lignin-contaning material is further reacted with a compound of heavy metal cation to form manganese-boron-heavy metal cation complexed sulfonated lignin-containing material.

20. A process as in claim 16 wherein said manganese-boron-complexed sulfonated lignin-containing material is further reacted with a compound of heavy metal cation to form manganese-boron-heavy metal cation complexed sulfonated lignin-containing material.

21. A process as in claim 19 wherein said heavy metal cation is iron.

22. A process as in claim 20 wherein said heavy metal cation is iron.

* * * * *